United States Patent [19]
Stephens

[11] 3,716,277
[45] Feb. 13, 1973

[54] AIR BRAKE RELEASE

[76] Inventor: Harvey Stephens, 1435 Michigan Street, Memphis, Tenn. 38106

[22] Filed: Aug. 9, 1971

[21] Appl. No.: 169,912

[52] U.S. Cl. ............................ 303/70, 303/68
[51] Int. Cl. ............................... B60t 15/22
[58] Field of Search .................... 303/68, 69, 70, 71

[56] References Cited

UNITED STATES PATENTS

| | | | |
|---|---|---|---|
| 1,638,457 | 8/1927 | Quates | 303/70 |
| 1,922,417 | 8/1933 | Bogut | 303/70 X |

*Primary Examiner*—Trygve M. Blix
*Assistant Examiner*—John J. McLaughlin
*Attorney*—Howard I. Podell

[57] ABSTRACT

Apparatus for the release of railroad air brakes, which consists of a pressure sensitive control valve which supplies air to a piston to bleed the air brake reservoir, and thus release set brakes, together with valving sensitive to the position of the air brakes which controls the air supply to the said pressure sensitive control valve so that said valve is inoperative when brakes are in the released state.

4 Claims, 2 Drawing Figures

INVENTOR.
HARVEY STEPHENS

AIR BRAKE RELEASE

SUMMARY OF THE INVENTION

The object of this invention is to insure the release of railroad air brakes as required by providing an alternate means of bleeding the air brake reservoir, when the conventional triple valve fails to perform this function in the normal sequence.

In this invention, a pressure sensitive control valve is added to the system. When the brakes are in the ON mode, air from the train line is admitted to this pressure sensitive control valve, which is set to pass air only after the train line system returns to 70 psig pressure. It is to be noted that the train line system is at 70 psig or greater when the brakes are in the OFF mode, and at less than 70 psig when the brakes are set in the ON mode.

Compressed air from the train line system is thus fed by the pressure sensitive control valve to a bleeder cylinder, after the train line reaches 70 psig or greater, and the brakes do not release. The bleeder cylinder is the extended position releases a bleeder valve on the air reservoir supplying the brake cylinder with air pressure. Bleeding of the air reservoir acts to reduce the air pressure in the brake cylinder, causing said brakes to release to the OFF mode. Once the brakes have reached the OFF position, the line connecting the train line to the pressure sensitive control valve is interrupted by a valve, and simultaneously a second vent valve discharges the compressed air in the bleeder cylinder. The bleeder cylinder under the action of the piston return spring closes the bleeder valve on the air reservoir, permitting the air reservoir to recharge with air pressure.

BRIEF DESCRIPTION OF THE DRAWINGS

The objects and features of the invention may be understood with reference to the following detailed description of an illustrative embodiment of the invention taken together with the accompanying drawing in which.

DESCRIPTION OF THE PREFERRED EMBODIMENT

Figure 1:
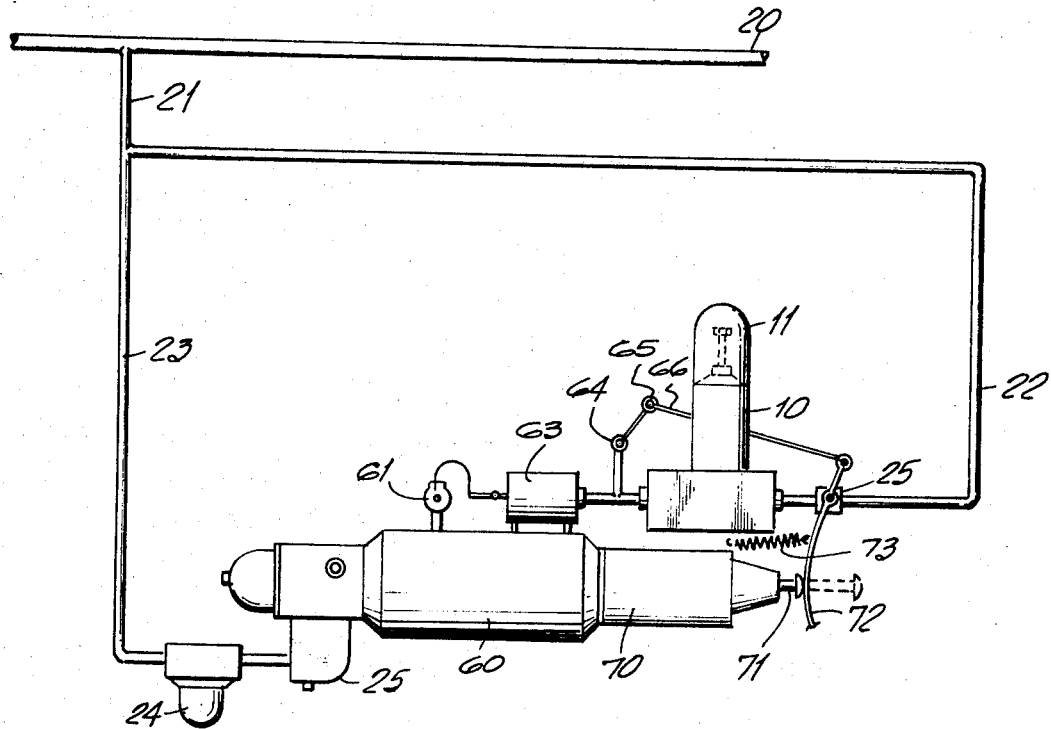
FIG. 1 is a diagram of the improved braking system of this invention.

Turning now descriptively to the drawings in which similar reference characters denote similar elements throughout the several views, FIG. 1 illustrates the improved brake release system of the invention.

In the conventional system, air is fed from the train line 20 via lines 21 and 23 through dust filter 24 to triple valve 25, shown mounted on air reservoir 60. The brakes are retained in the OFF mode by the operator maintaining an air pressure of 70 psig or greater in the train line system. In this mode, the triple valve 25 acts to charge air reservoir 60 with pressure corresponding to the train line pressure. Reduction of the pressure of train line 20 by the operator, or by accidental disruption of train hoses, acts to set the brake 72 to the ON mode. Under reduced supply pressure, the triple valve 25 disconnects the air reservoir from the supply train line 20 and connects the charged air reservoir to the brake cylinder 70. However, in the conventional system, there are occasions, when the brakes fail to release automatically after the supply train line pressure has been restored, with triple valve 25 not performing in the required fashion to vent the pressure in brake cylinder 70. In these cases, a great deal of manual effort is required to reset the brakes. If the situation is not corrected on an individual car wheel, and the train is in motion, a dangerous situation ensues, resulting in fire or derailment.

In this invention, pressure sensitive control valve 10 is connected to the train line 20 by means of line 22 and valve 25. Valve 25 is set in the open position by lever 72 attached to the brake piston 71, such that air from the train line 20 is fed into pressure sensitive control valve 10 only when the brakes are in the ON mode, as shown in FIG. 2.

Control valve 10 is adjusted by means of screw 12 and spring 13 which are protected by dust cap 11 to permit passage of air when the pressure against diaphragm 14 reaches 70 psig. Such pressure in the train line would be reached when the operator has set his controls so as to release the brake system. Under this condition, air pressure is created in cylinder 63 causing piston 41 to move against spring 42 so as to move shaft 62. Shaft 62 is adjusted for correct length by turnbuckle 43, and connects with bleeder cock 61 mounted on air reservoir 60.

The result of pressure in cylinder 63 is for shaft 62 to open bleeder cock 61, thus bleeding reservoir 60 of air pressure. Since the brakes have remained in the ON mode, despite the return of train line pressure to 70 psig, the triple valve 25 remains in the position connecting air reservoir 60 to brake cylinder 70. Thus bleeding of air reservoir 60 results in loss of air pressure in brake cylinder 70, and under spring return, brake cylinder 70 retracts, releasing the brakes to the OFF mode.

Figure 2:
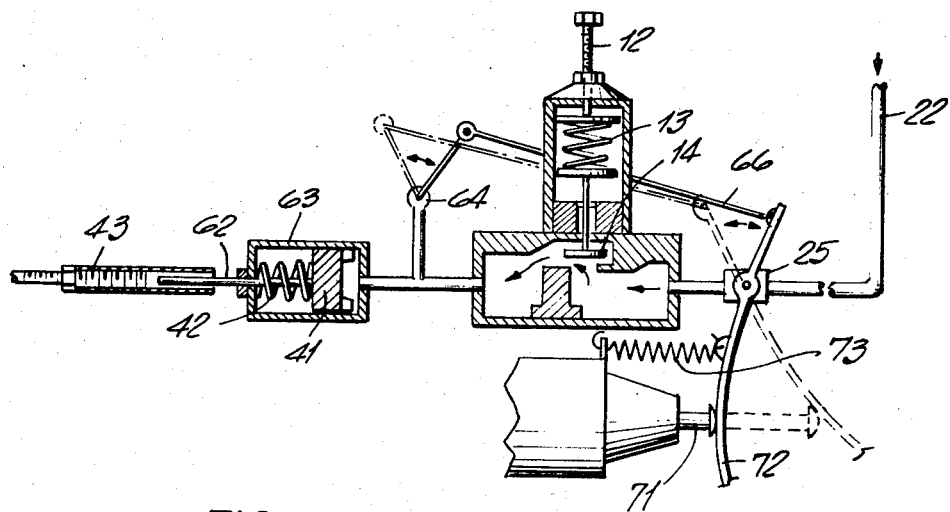
FIG. 2 is a partial cross-section of a segment of the system.

Once the brakes have been retracted to the OFF mode, as shown by the solid lines in FIG. 2, valve 25 is closed, and rod extension 66 opens bleeder cock 64, bleeding air pressure out of cylinder 63. Piston 41 of cylinder 63 retracts under the pressure of return spring 42 to close bleeder cock 61. The triple valve now is enabled to recharge reservoir 60 with the supply train line pressure, but the brakes remain in the OFF mode, since the triple valve does not permit air into the brake cylinder 70, and the system is ready to recycle when required.

Since obvious changes may be made in the specific embodiment of the invention described herein without departing from the scope thereof, it is indicated that all matter contained herein is intended to be interpreted in an illustrative and not a limiting sense.

Having thus described my invention, what I claim as new, and desire to secure by Letters Patent of the United States is:

1. Apparatus for release of air brakes which have been set to the ON mode by a reduction in the pressure of the supply line acting on a triple valve so as to connect the air brake cylinder with the air reservoir, said triple valve having also disconnected the air reservoir from the supply line, with such apparatus acting to release said air brakes to the OFF mode after the supply line has been returned to its normal operating pressure, such apparatus consisting of a pressure sensitive control valve with means to regulate the setting of pressure which controls said valve, said pressure sensitive control valve permitting air to flow through said valve when the supply air pressure reaches a predetermined minimum level, and means to connect the inlet of said control valve to the supply line when the brakes are set in the ON mode, and means to connect the outlet of said control valve to an air cylinder which under air pressure acts to operate a cock to bleed the air reservoir, such that when the brakes remain in the ON mode after the supply line has returned to its normal operating pressure, the effect of the control valve is to cause the bleeding of the air reservoir and the brake cylinder of air pressure causing the brakes to retract to the OFF mode.

2. Apparatus for the release of air brakes as described in claim 1 with means to disconnect said pressure sensitive control valve from the supply line when the brakes have retracted to the OFF mode, and means to vent air pressure from the outlet line of said control valve when the brakes have retracted to the OFF mode, such that bleeding of the air reservoir by the air cylinder operated cock is terminated, permitting said air reservoir to be recharged through the triple valve and supply line to its normal pressure preliminary to its next operating cycle.

3. Apparatus for the release of air brakes as described in claim 2 in which the pressure sensitive control valve includes a diaphragm which is held in the closed position by a compression spring, with screw means to increase or decrease the compressive force in said spring, such that when the total force of the air pressure at the inlet side of said control valve exceeds the force of said compression spring, said diaphragm is forced by the air pressure to the open position, permitting air to flow from the inlet to the outlet side of said control valve.

4. Apparatus for the release of air brakes as described in claim 3 in which the screw means to regulate said valve is protected by an external removable dust cover.

* * * * *